Figure 1:
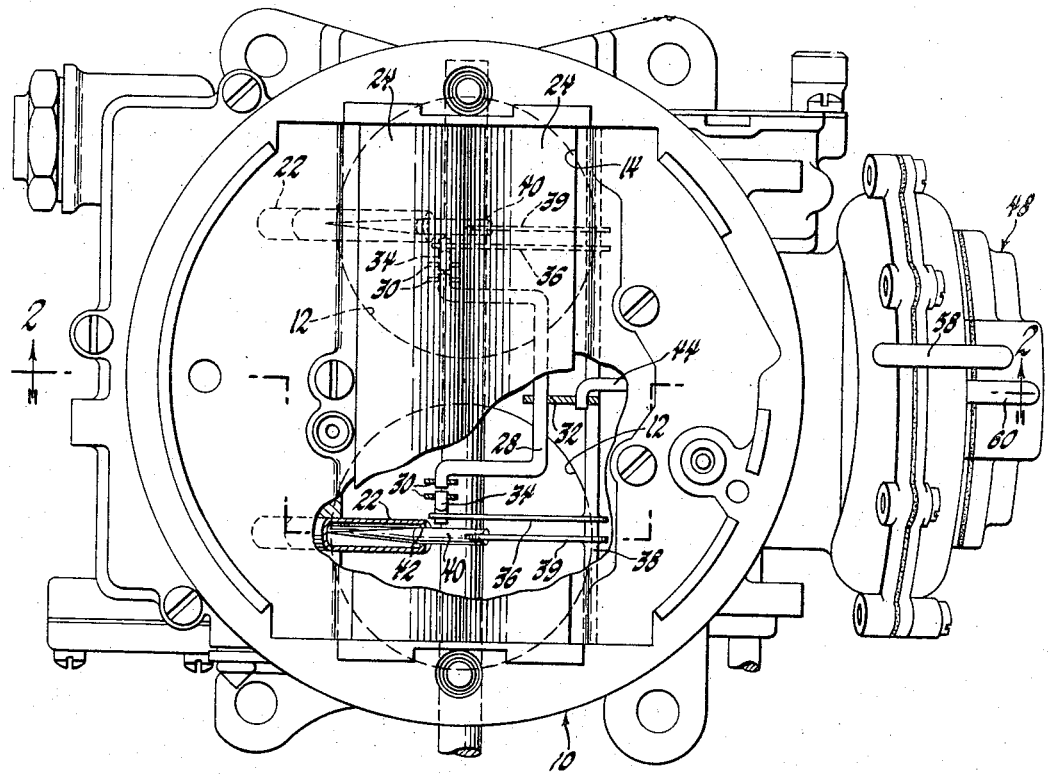

Sept. 19, 1967     S. H. MICK     3,342,464
AIR VALVE CONTROL
Filed Feb. 23, 1966

INVENTOR.
Stanley H. Mick
BY
C. K. Veenstra
ATTORNEY

United States Patent Office 3,342,464
Patented Sept. 19, 1967

3,342,464
AIR VALVE CONTROL
Stanley H. Mick, St. Clair Shores, Mich., assignor to General Motors Corporation, Detroit, Mich., a corporation of Delaware
Filed Feb. 23, 1966, Ser. No. 529,420
5 Claims. (Cl. 261—44)

This invention relates to internal combustion engine fuel systems having an air flow sensing mechanism which controls fuel metering and, more particularly, to means to reduce the hysteresis in the air flow sensing mechanism.

Customarily, in internal combustion engine fuel systems having air valve control of fuel metering, a rotatable air valve is located in the air inlet and controlled so that its position is responsive to and is a measure of the air flow to the engine. A fuel metering valve is connected to the air valve so that fuel flow is regulated in accordance with air flow to create a desired mixture of air and fuel. The mechanical connection of the air valve and the fuel metering valve reduces the sensitivity of the metering mechanism to hysteresis. However, in some applications the frictional resistance of the metering linkage becomes a significant factor in calibration of the fuel system.

One source of substantial frictional resistance in the metering mechanism is the biasing device which serves both to bring the mechanism to a closed position and, additionally, to set the pressure differential across the air valve. This invention divides these functions by providing a separate control to regulate the pressure drop across the air valve and thus regulate the position of the air valve. This separate control is pressure operated and is free of mechanical connection with the metering mechanism, thus avoiding the imposition of a load on the metering linkage. With this invention, the biasing device need only be strong enough to bring the metering mechanism to a closed position when no other force is applied thereto.

Figure 2:
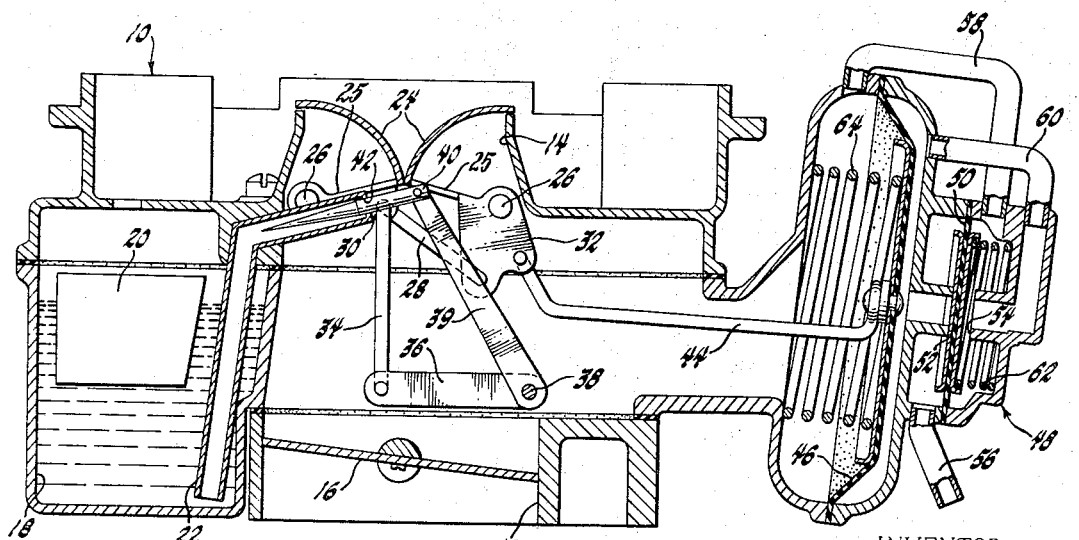

The details as well as other objects and advantages of this invention are disclosed in the following description and in the drawing in which:

FIGURE 1 is a top plan view of a two-barrel carburetor to which this invention has been applied; and FIGURE 2 is a sectional view along line 2—2 of FIGURE 1 showing the details of the balance valve which controls the pressure drop across the air valve.

Referring to the drawing, a carburetor 10 has a pair of downdraft mixture conduits 12 with a common rectangular air inlet 14. A throttle valve 16 is disposed in each mixture conduit 12 to control air flow therethrough. A fuel bowl 18 contains fuel maintained at a substantially constant level by a conventional float mechanism 20. A pair of fuel discharge tubes 22 are disposed to deliver fuel from fuel bowl 18 to each mixture conduit 12.

A pair of upwardly opening air valves 24 are mounted in air inlet 14 by struts 25 which extend to shafts 26 to provide a central opening for air flow through mixture conduits 12. A link 28 extends between a tab 30 secured to one of air valves 24 and a tab 32 secured to the strut 25 on the other air valve 24 so that air valves 24 move simultaneously. A link 34 interconnects tab 30 with a lever 36 mounted on a pivotal shaft 38. Links 28 and 34 and lever 36 may be conveniently located between mixture conduits 12 to avoid any restriction of air flow through inlet 14. A pair of lever arms 39 are also secured to shaft 38, each arm 39 extending into a mixture conduit 12. Each arm 38 positions a metering rod 40 within an orifice 42 located at the outlet of discharge tube 22, there being one metering rod and one discharge tube 22 for each mixture conduit 12. By this mechanism, fuel flow into mixture conduits 12 is regulated by metering rods 40 in accordance with air flow through the mixture conduits.

A link 44 extends from tab 32 and connects the above-described metering mechanism with a flexible, pressure responsive diaphragm 46. The left side of diaphragm 46 is exposed to the pressure in mixture conduits 12 below air valves 24 while the pressure to the right of diaphragm 46 is controlled by a valve mechanism 48. The pressure applied through valve mechanism 48 positions diaphragm 46 and air valves 24 to maintain a constant pressure drop across air valves 24. By this means air valves 24 are opened to increase the air flow area as the engine requires a greater air flow and are closed as the air flow requirement decreases.

Valve mechanism 48 includes a flexible diaphragm valve 50 disposed between a pair of oppositely facing valve seats 52 and 54. Valve 50, cooperating with valve seat 52, controls the flow of air at atmospheric pressure from an inlet 56 to the right-hand side of the main diaphragm 46. Valve 50, cooperating with valve seat 54, allows air at the reduced pressure within mixture conduit 12 below air valves 24 to be applied against the right-hand side of the main diaphragm 46 through inlets 58 and 60.

In operation, as throttle 16 is opened, the vacuum therebelow is communicated to the left-hand side of diaphragm 46 which, operating through link 44, begins to open air valves 24 to allow air flow through the mixture conduits 12. At the same time, the vacuum is applied through conduit 58 to the right-hand side of diaphragm valve 50 which is drawn back against the predetermined force of a spring 62. The atmospheric pressure of air entering through inlet 56 is then applied against the right-hand side of diaphragm 46 to assist in opening the air valves. When air valves 24 have opened sufficiently to reduce the vacuum therebelow to a predetermined value, spring 62 closes valve 50 against valve seat 52 and opens valve 50 from valve seat 54 to allow the pressure below air valves 24 to be also applied through inlets 58 and 60 to the right-hand side of main diaphragm 46. Thus the pressures on opposite sides of diaphragm 46 will be balanced, thereby preventing further opening of the air valves. It will be appreciated that diaphragm 46 does not have to overcome the force of a spring or eccentric weight when air valves 24 should open since spring 62 sets the air valve depression.

A light spring 64, shown here as biasing diaphragm 46, biases the metering linkage to a closed position. Spring 64 need be no stronger than is required to move the metering mechanism when the pressures across diaphragm 46 are balanced. Therefore, spring 64 does not contribute significantly to the hysteresis of the metering linkage.

It will also be appreciated that the pressure of air admitted through inlet 56 should preferably be the same as the pressure of air above air valves 24 and therefore that, if an air cleaner is used on carburetor 10, a tube should connect inlet 56 with the clean side of the air filter.

This invention is especially advantageous when used in the above-described carburetor which has a pair of air valves to provide a central air inlet opening and a metering linkage which meters the fuel at the point where it is delivered into the air stream. However, it will be appreciated that the invention is applicable to other metering devices having, for example, only one air valve.

I claim:
1. An internal combustion engine fuel system including an air flow inlet, a fuel flow inlet, fuel metering means regulating flow through said fuel inlet, and air flow sensing means controlling said fuel metering means to regulate fuel flow in accordance with air flow, said air flow sensing means comprising air valve means variably positioned within said air inlet, a first flexible pressure responsive diaphragm connected to said air valve means to control the position thereof, pressure connections subjecting opposing sides of said diaphragm respectively to the first pressure in said air inlet upstream of said air valve means and to the second pressure in said air inlet downstream of said air valve means whereby a pressure differential is created across said diaphragm to move said air valve means, said pressure connections including control means to substantially equalize the pressures on opposite sides of said diaphragm and maintain the pressure differential across said air valve means substantially constant whereby said air valve means are positioned in accordance with air flow through said air inlet, and closing means biasing said diaphragm and air valve means with only sufficient force to close said air valve means when the pressures on opposing sides of said diaphragm are substantially equal whereby said closing means does not add appreciably to hysteresis in said air flow sensing means.

2. The fuel system of claim 1 wherein said pressure connections subject one side of said diaphragm to the second pressure in said air inlet downstream of said air valve means and wherein said control means is responsive to said second pressure to vary the pressure applied against the opposite side of said diaphragm between said second pressure and the first pressure in said air inlet upstream of said air valve means.

3. The fuel system of claim 2 wherein said control means comprises a pair of facing valve seats and a diaphragm valve positioned therebetween, one side of said diaphragm valve being subjected to said first pressure and controlling application of said first pressure to said opposite side of said first diaphragm through one of said valve seats, the opposite side of said diaphragm valve being subjected to said second pressure and controlling application of said second pressure to said opposite side of said first diaphragm through the other of said valve seats.

4. The fuel system of claim 1 wherein said air valve means comprises a pair of air valve portions pivotally mounted on opposite sides of said air inlet and providing a central valve opening and which further comprises means linking said air valve portions for simultaneous operation.

5. The fuel system of claim 1 which comprises a carburetor wherein said air inlet forms a portion of a downdraft mixture conduit, wherein said fuel inlet comprises a nozzle discharging into said mixture conduit downstream of said air valve means, wherein said fuel metering means comprises a metering rod in said mixture conduit regulating fuel flow through said nozzle, and wherein said air valve means comprises a pair of upwardly opening air valve portions pivotally mounted on opposite sides of said mixture conduit and providing a central valve opening, said air valve means further comprising means linking said air valve portions for simultaneous operation.

References Cited
UNITED STATES PATENTS

| | | | |
|---|---|---|---|
| 2,232,351 | 2/1941 | Udale | 261—44 X |
| 3,023,744 | 3/1962 | Mick | 261—50 X |
| 3,069,146 | 12/1962 | MacNeill | 261—44 |
| 3,078,079 | 2/1963 | Mick. | |
| 3,243,167 | 3/1966 | Winkler | 261—50 X |

HARRY B. THORNTON, *Primary Examiner.*

FRANK W. LUTTER, *Examiner.*

TIM R. MILES, *Assistant Examiner.*